Patented Apr. 22, 1930

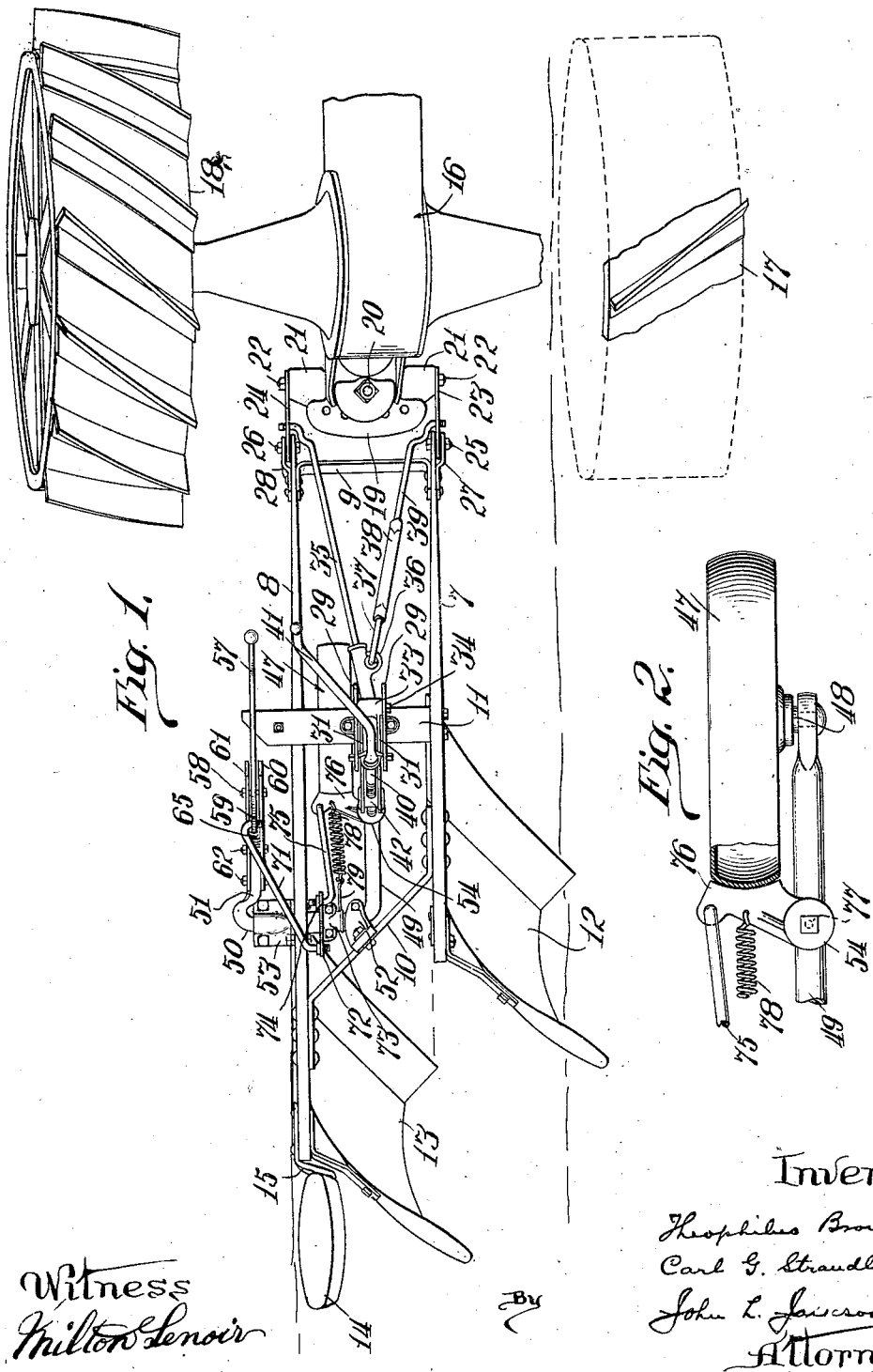

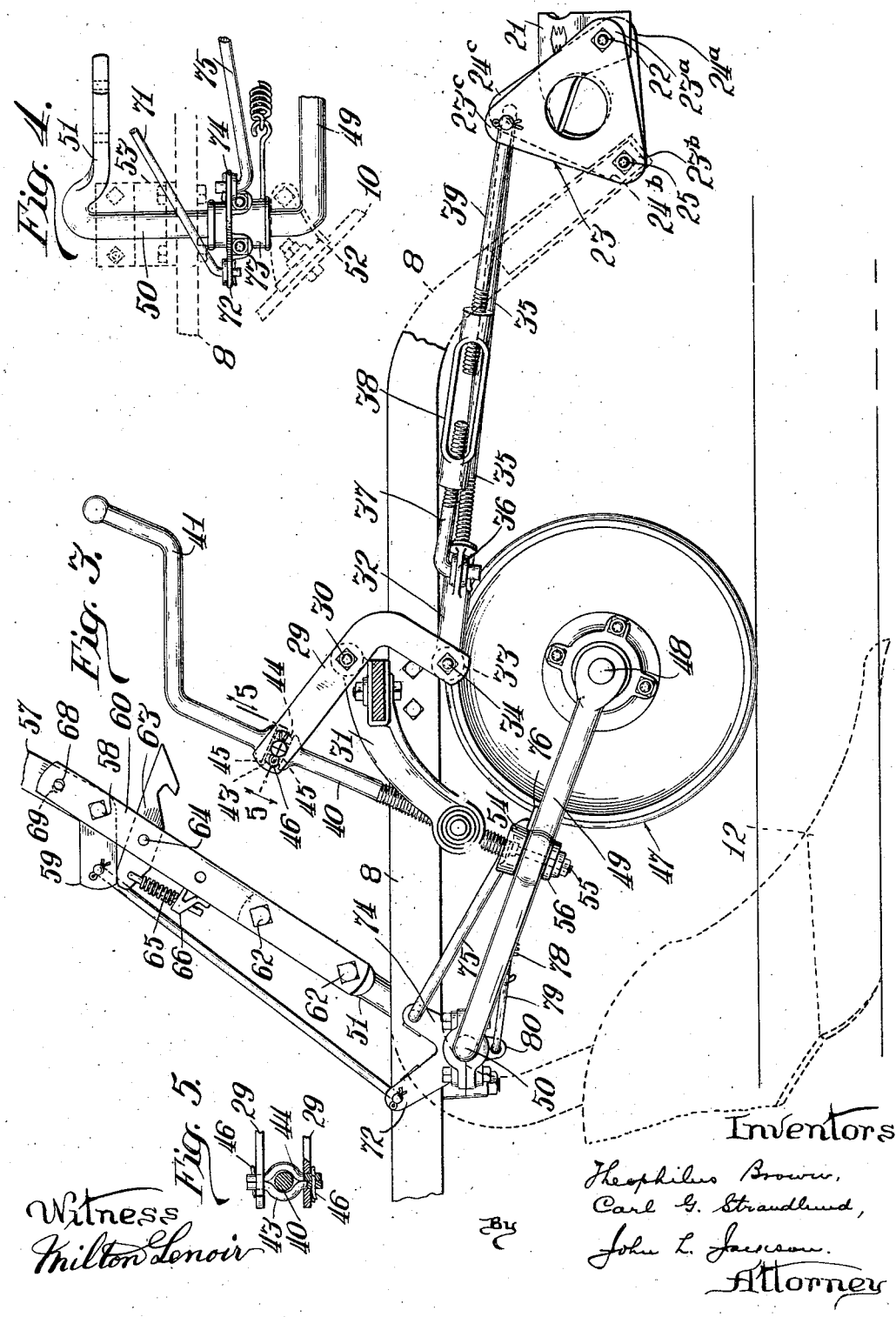

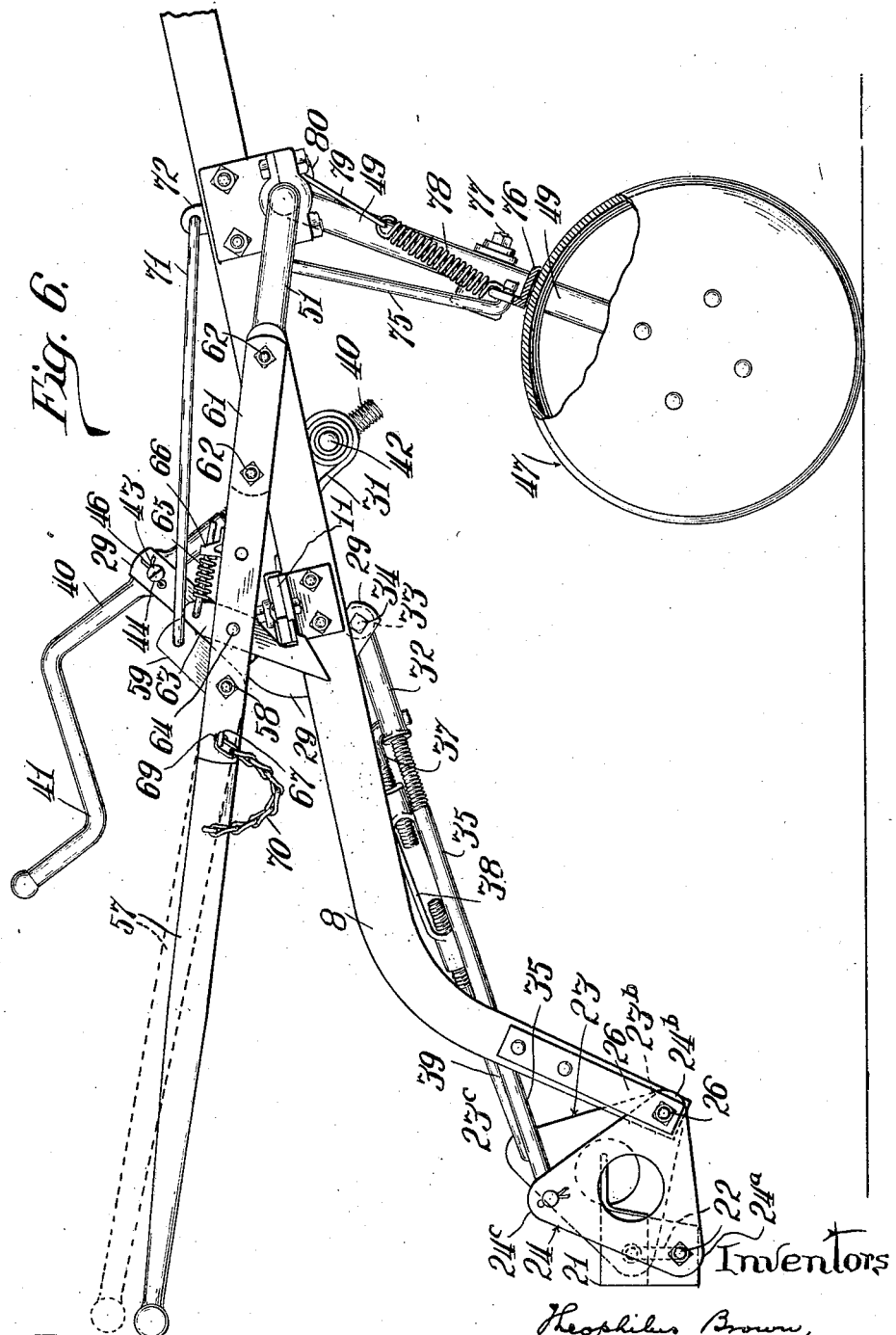

1,755,808

UNITED STATES PATENT OFFICE

THEOPHILUS BROWN AND CARL G. STRANDLUND, OF MOLINE, ILLINOIS, ASSIGNORS TO DEERE & COMPANY, OF MOLINE, ILLINOIS, A CORPORATION OF ILLINOIS

TRACTOR PLOW

Original application filed January 28, 1924, Serial No. 689,029. Divided and this application filed January 13, 1927. Serial No. 160,805.

Our invention relates to plows of the tractor drawn type, and, generally speaking, it has for its object to provide a close coupled plow which will handle easily for transportation and in small fenced fields, so that the plow can be used in plowing in close quarters, such as fence corners, and one that can be backed easily. It also has for its object to provide a power lift plow that can readily be raised or lowered out of or into operative position by the tractor operator without leaving his seat, and one that will be simple in construction, relatively of light weight, and that will be provided with means for leveling the plow or plows, and for regulating the depth of plowing, and incidentally suitably adjusting the hitch point between the plow and the tractor so that the plow will operate properly at whatever depth at which it may be adjusted to run. Other improved features which need not be mentioned at this time will be pointed out in the course of the description of the embodiment of our invention shown in the accompanying drawings, which it will be understood illustrate one only of the various forms in which our improvements may be applied. What we regard as new will be set forth in the claims.

In the accompanying drawings,—

Fig. 1 is a plan view of our improved plow, all but the rear wheels of the tractor and the rear portion of the frame thereof being omitted, and one of the rear wheels being shown principally in dotted lines;

Fig. 2 is a detail illustrating the depth limiting and plow lifting wheel with some of the parts associated therewith, a portion of the rim of the wheel being shown in section;

Fig. 3 is an enlarged detail, being a partial side elevation with one of the plow beams removed to better show the arrangement of the lifting, depth limiting and leveling devices, and also the adjustable hitch connections;

Fig. 4 is a detail, being a partial plan view illustrating a part of the bail or axle by which the lifting wheel is carried and on which also the lifting lever is mounted, some parts of the plow being shown in dotted lines;

Fig. 5 is also a detail, being approximately a section on line 5—5 of Fig. 3; and Fig. 6 is a reversed view of the parts shown in Fig. 3 illustrating their position when the plow is lifted out of its operative position.

Our improved plow is designed to be coupled directly to the frame, or rear axle housing, of a tractor provided with a rearwardly projecting draw-bar rigidly secured to said housing, and it is desirable that the connection between the plow beam or beams and said draw-bar be such that the plows will be capable of swinging laterally to a limited extent so that they will not interfere with the proper steering of the tractor, as would be the case if they were held against all lateral swinging. The plows must also be capable of swinging vertically into or out of operative position, and of rocking to a limited extent about a longitudinal axis to compensate for the transverse tilting of the tractor, owing to the fact that the wheels at one side thereof run in the furrow and those at the other side on the land, so that the plow bottoms will run level. It is also important to provide means for vertically adjusting the hitch point at the front end of the plow when the depth of plowing is changed, so that the plow bottoms will run properly at the depth to which they may be adjusted. The manner in which these several desirable results are obtained will now be described, but it should be mentioned here that the hitch connections, and the means for controlling their position, are not claimed herein, as they are included in the subject-matter of our pending application, Serial No. 689,029, filed January 28, 1924, of which this application is a division.

By reference to Fig. 1, it will be seen that for the purposes of this specification we have chosen to show our improvements applied to a two bottom gang plow of the so-called frameless type, i. e. one in which there is no frame other than that formed by the plow beams, which are rigidly braced together in parallel relation to each other and at the proper distance apart so that the plow bottoms plow consecutive furrows. The number of plow bottoms used is, of course, optional. As shown in the drawings, 7, 8 indicate the plow beams, which are connected together at the front by a U-shaped brace 9, and at the rear by a diagonal brace 10. A transversely-disposed plate 11 serves not only as an intermediate brace, but also performs certain other functions which will be hereinafter pointed out. The numerals 12, 13 indicate the two plow bottoms, and 14 indicates a rear furrow wheel or rolling landside which is carried by a bracket 15 secured to and projecting rearwardly from the beam 8. The rear axle housing or frame of the tractor is shown at 16, and 17, 18 indicate the rear wheels of the tractor, of which 17 is the furrow wheel and 18 the land wheel. Secured to the rear portion of the tractor frame 16 is a draw-bar 19, which is bolted to the frame 16 so that it is held rigidly in position, and pivotally connected with said draw-bar by a vertical pivot 20 is a transversely disposed plate 21, as shown in Fig. 1. The construction of these parts need not be described specifically herein as it is not a part of the subject-matter of this application, and is fully shown and described in our said pending application.

The plate 21 is pivotally connected with the plow beams to permit said beams to swing vertically about the pivotal connection between said members, and said plate is adapted to be shifted endwise relatively to the draw-bar 19 so that the plows may be adjusted laterally to obtain the right width of cut. Mounted in down-turned end portions of the plate 21 is a transverse pivot bolt 22 about which the plow swings vertically when raised or lowered, as hereinafter described, which end portions are preferably of different lengths,—to facilitate mounting the bolt 22 so that it will assume a horizontal position, or approximately so, when the tractor plow is in use. The position of said bolt will of course vary to some extent with different depths of plowing.

The plow beams 7, 8 are respectively connected with the draft devices by means of a hitch device, which in the present instance comprises triangular plates 23, 24, as best shown in Figs. 1 and 3, said plates constituting in effect three armed levers, the arms of which are represented by the apices of the triangles. The forward arms 23$^a$, 24$^a$ thereof are pivotally mounted on the bolt 22 so that the plates 23, 24 may swing vertically about said bolt. The rearward arms 23$^b$, 24$^b$ of said plates are pivotally connected respectively by bolts 25, 26 with the forward ends of the beams 7, 8, the outer ends of said bolts being braced by straps 27, 28, as shown in Fig. 1. These straps overlap the plates 23, 24 and serve to hold them in parallelism with the vertical planes of the plow beams. The uppermost arms 23$^c$, 24$^c$ of the plates 23, 24 are connected with the lower arm of a leveling lever 29 which is pivoted to swing fore and aft in a vertical plane upon a pivot 30 carried by a bracket 31 secured to the transverse plate 11, as shown in Fig. 3. The lever 29 is preferably made of two parallel bars spaced apart and of bell-crank shape, as shown in Figs. 1 and 3, and said lever is connected with the plates 23, 24 by means of a coupling 32 having a boss 33 at its rear end which fits between the members of the lever 29, as shown in Fig. 1, and is connected thereto by a pivot 34. The opposite end of the coupling 32 is internally screw threaded to receive the threaded rear end of a connecting rod 35, the forward end of which is pivotally connected with the arm 24$^c$ of the plate 24, as best shown in Figs. 1 and 6. At one side of the coupling 32 adjacent to its forward end is a boss 36 having an eye which receives the hooked rear end of a rod 37, the forward end of which is threaded to enter a turn buckle 38 by which it is connected to a rod 39 which at its forward end is pivotally connected with the arm 23$^c$ of the plate 23, as shown in Figs. 1 and 3. The members 37, 38 and 39, therefore, constitute an extensible connecting rod which connects the coupling 32 with the plate 23. As the lever 29 is located approximately midway between the beams 7, 8, as shown in Fig. 1, the connecting rods between said lever and plates 23, 24 diverge forwardly, and it will be apparent that by means of the turn buckle 38 the length of the connecting rod between the coupling 32 and the plate 23 may be varied to rock said plate vertically about the pivot 22, thereby raising or lowering the forward end of the beam 7 relatively to that of the beam 8, and consequently rocking the plows relatively to a longitudinal axis. By this means the plows may be made to run level regardless of the lateral tipping of the tractor. The plates 23, 24 may, however, be swung vertically in unison to raise or lower the hitch point of the plow beams with relation to the pivot 22 which connects said plates with the draft devices by rocking the lever 29 about its fulcrum or pivot 30. For so rocking said lever we employ a rod or shaft 40 arranged in an approximately upright position and provided at its upper end with a crank 41 by means of which it may be rotated, as best shown in Figs. 3 and 6. The lower end of said shaft is screw threaded and works in a threaded sleeve 42 journaled in the lower end portion of the bracket 31, which is bifurcated as best shown in Fig. 1, the lower end portions of said bracket being spaced apart to permit the shaft 40 to pass between them. By this arrangement separated bearings are provided for the end portions of the sleeve 42 so that it is firmly supported. The lower end of the shaft 40 serves as an adjustable limit stop to regulate the depth of plowing, as will be hereinafter described. The upper arm of the lever 29 is operatively connected with the shaft 40 by means of a split collar composed of members 43, 44, shown in Fig. 5, the end portions of which are fitted in openings in the upper end portions of the bars composing the lever 29, while the intermediate portions of said members serve as a collar which lies in an annular groove 45 provided in the shaft 40, as shown in Fig. 3. Cotter pins 46 serve to keep the bars of the lever 29 from slipping off the ends of said members.

By this construction when the shaft 40 is rotated by means of the crank 41, it will move longitudinally through the sleeve 42, thereby moving the upper arm of the lever 29 up or down and the lower arm of said lever fore and aft. Forward movement of the latter arm will thrust forward on the arms 23°, 24° of the three armed levers 23, 24, thereby rocking said levers about their pivot 22 and lifting the hitch point of the forward ends of the beams 7, 8. Conversely rearward movement of the lower arm of the lever 29 lowers the hitch point of the front ends of the beams. By means of the shaft 40, therefore, the hitch point may be raised or lowered readily for plowing at different depths. The range of hitch adjustment may be modified if desired by means of the screw threads on the rods 35, 37 and 39, shown in Fig. 1, but ordinarily the adjustment provided for by the shaft 40 and lever 29 suffices.

It will be noted that the hitch is always very low relatively to the tractor so that the effect is to put the weight on the front wheels of the tractor, consequently making steering easier and giving better control, a feature that is especially desirable under heavy operating conditions.

For limiting the depth of plowing, supporting the plow for transportation, and for furnishing power to aid in lifting the plow out of the ground, we provide a wheel 47 mounted on a spindle 48 carried by an arm 49 that extends forward from a transversely disposed rock shaft 50, best shown in Fig. 4. The arm 49 is preferably formed integral with one end of the rock shaft 50, which at its other end is provided with a forwardly and upwardly projecting arm 51. Said rock shaft is journaled in bearings provided in brackets 52, 53 secured respectively to the diagonal brace 10 and the beam 8, as best shown in Fig. 1, and indicated by dotted lines in Fig. 4. As best shown in Figs. 1 and 3, said rock shaft is so arranged that the arm 49 extends under the lower end of the shaft 40, where it is provided with a bearing block 54 suitably secured to it, as by a bolt 55 and clamp plate 56, shown in Fig. 3, which block is adapted to underlie the lower end of the shaft 40 and is preferably provided with a recess to receive the same, as indicated by dotted lines in the latter figure. By this arrangement the shaft 40 forms an adjustable stop which limits the extent to which the arm 49 and wheel 47 may swing upward toward the plow beams. When the plow is in use the wheel 47 runs on the land, and when the block 54 is in contact with the lower end of the shaft 40 obviously the plow bottoms cannot penetrate the soil more deeply. Therefore, by setting the shaft 40 at any desired point, the wheel 47 operates to hold the plow bottoms from penetrating more deeply than the maximum depth permitted by the shaft 40. As has been explained, adjustment of the shaft 40 to regulate the maximum depth of plowing also adjusts the hitch point vertically, and it will be apparent from an inspection of Fig. 3 that these adjustments are correlated so that automatically when the shaft 40 is moved down, for example, to decrease the depth of plowing, the lever 29 will be rocked about its pivot 30 in a counter-clockwise direction as viewed in said figure, thereby rocking the three armed lever plates 23, 24 in a clockwise direction, and consequently raising the point of hitch of the beams 7, 8 to correspond with the reduced plowing depth. Adjustment of the shaft 40 in the opposite direction to increase the plowing depth lowers the point of hitch by rocking the lever 29 in a clockwise direction as viewed in Fig. 3. By this construction, therefore, the point of hitch is always maintained substantially in the line of draft, regardless of the plowing depth, in this respect our present construction being similar, generically, to that of our pending application, Serial No. 371,245, filed April 5, 1920, and the application of Carl G. Strandlund, Serial No. 374,835, filed April 19, 1920. It should be noted that the arm 49 is not positively connected with the hitch controlling devices, but is free to swing toward and away from the lower end of the shaft 40; consequently such controlling devices not only serve to adjust the hitch point to vary the depth of plowing, but also to adjust the plow bodies simultaneously when the plow is in the ground, and permit the tractor to rise and fall independently of the plow, or, conversely, the plow to rise and fall independently of the tractor. Under ordinary operating conditions the wheel 47 to a large extent floats, and there is no material thrust of the lower end of the shaft 40 against the block 54; indeed, these parts may at times be entirely out of contact with each other, but if the plows should tend to run more deeply into the ground than the depth for which the hitch is set, the shaft 40 will then abut against the block 54 and the wheel 47 will hold the plows from penetrating more deeply.

For lifting the plows above the ground for transportation purposes, the rock shaft 50 and the arm 49 function as a bail or crank axle pivoted to swing about the axis 48 of the wheel 47 so that the rock shaft portion 50 thereof is swung upward and forward, thereby lifting the plow beams and plows in the manner shown in Fig. 6. By then locking the parts in such position the plows will ride on the wheel 47, which then serves as a transporting wheel. When the plows are so lifted, the beams 7, 8, together with the plates 23, 24, swing approximately vertically about the pivot bolt 22, and the hitch adjustments and leveling connections remain unaffected.

For the purpose of raising and lowering the plows, a manually operated lever 57 is provided, said lever being fulcrumed at 58 and having a short arm 59 projecting at an angle to the main portion of the lever. The fulcrum 58 is mounted between bars 60, 61 that form extensions of the arm 51, to which they are firmly secured in any suitable way, as by bolts 62 shown in Figs. 1 and 3. It will be seen that this construction forms a "broken lever", the upper part of which consists of the member 57 and the lower part of which consists of the arm 51 and the two side bars 60, 61. Between the bars 60, 61 is also mounted a latch lever 63 mounted between its ends on a pivot 64, as shown in Fig. 3. The latch portion of said lever is so arranged that when the lever 57 is moved downward to approximately the limit of its lifting movement, the latch 63 will hook over the transverse bar 11, thereby holding the plow beams in their raised position, as shown in Fig. 6. The latch 63 is moved into latching position by means of a spring 65 connected to one end portion of said latch lever, and bearing against a lug 66 secured to the bars 60, 61, as shown in Fig. 3. As also shown in said figure, one edge of the arm 59 of the lever 57 is adapted to bear against the adjacent edge of the latch lever 63, so that by providing for a little lost motion between the lever 57 and the bars 60, 61 said lever may be rocked sufficiently in a clockwise direction as viewed in Fig. 6, to release the latch from the bar 11, thereby permitting the plows to descend. To avoid accidental release of the latch lever 63 when the plow is being transported, provision is made for locking the lever 57 rigidly with relation to the bars 60, 61, the means for this purpose comprising a cotter pin or key 67 which is adapted to be inserted in holes 68, 69 in the upper end portions of the bars 60, 61 and in the lower portion of the lever 57, respectively, when said lever is in alinement with said bars. Therefore, by inserting the key 67 in said holes, the lever 57 cannot be actuated to release the latch. The key 67 is preferably attached to the bar 61 by a chain 70 so that it will not be lost.

In order to make use of the draft of the tractor as an aid in lifting the plows into transporting position, the arm 59 of the lever 57 is connected by a rod 71 with an arm 72 carried by a sleeve 73 loosely mounted on the rock-shaft 50, as shown in Figs. 3 and 4. Said sleeve is also provided with an arm 74 which is connected by a rod 75 with the free end portion of a brake shoe 76 which is pivoted at 77 on the arm 49, as best shown in Fig. 2. Said brake shoe is so placed that it may be swung into and out of engagement with the periphery of the wheel 47 by rocking the sleeve 73, but it is normally held out of engagement with said wheel by a spring 78 connected by a rod 79 with an arm 80 also carried by the sleeve 73, as shown in Fig. 3. The arrangement of these parts is such that by moving forward the upper end of the lever 57 it will rock on its fulcrum 58. Consequently through the arm 59 of said lever, the connecting rod 71 and the rod 72 of the sleeve 73, said sleeve will be rocked in a clockwise direction as viewed in Fig. 3. This will cause the brake shoe 76 to be applied to the wheel through the thrust transmitted by means of the rod 75, and consequently the braking of the wheel will make the force of the draft effective to lift the plows, since the draft will tend to swing the arm 49 in a clockwise direction about the axis 48 of the wheel 47. At the same time the manual force applied to the lever 57 will also tend to swing the arm 49 in the same direction, and therefore will aid in lifting the plows. By this means the arm 49, together with manually operable lever 57, bars 60 and 61, and arm 51, movable with the arm 49 and substantially forming a swingable unit therewith, will be swung to the position shown in Fig. 6, whereupon the latch 63 will engage the bar 11 and the plows be thereby held up, and supported in transporting position by said wheel. By then locking the lever 57 in alinement with the bars 60, 61 by means of the key 67, as above described, not only is accidental release of the latch 63 prevented, but also the brake 76 is relieved of the brake applying influence of the weight of the lever 57 so that it does not drag on the wheel. The holes 68, 69 are arranged to aline before the lever 57 reaches its brake setting position, and therefore when the key 67 is inserted the brake is held out of braking contact with the wheel. This feature of providing for the cooperation of manual and power actuated lifting means for the plows is an important part of our invention, as it facilitates the lifting oepration and makes it unnecessary to provide more elaborate power operated lifting mechanism capable in itself of performing the entire work of lifting. It is evident that in the arrangement shown the greatest exertion of power is necessary at the beginning of the lifting operation, at which time the lever 57 is in its most favorable position not only to apply the brake, but also to function as a lever for lifting purposes. As the beams rise, the angle between the arm 49 and the beams becomes greater, and consequently the draft of the tractor is applied under more favorable conditions, so that less assistance from the direct action of the lever 57 is needed as the position of said lever becomes less favorable. The plows, therefore, are lifted smoothly, and to a large extent by the draft of the tractor, so that the lifting operation can be performed without difficulty by an operator in the driver's seat. It is not necessary that the wheel be locked against rotation in order to lift the plows, but only that it be braked sufficiently to enable the draft of the tractor, aided by such manual effort as the operator may employ, to swing the arm 49 to its elevated position. To lower the plows it is necessary only to withdraw the key 67 and then swing the lever 57 to the position shown in dotted lines in Fig. 6, which will release the latch 63, whereupon the plows will descend of their own weight.

It will be noted that when the sleeve 73 is rocked to apply the brake to the wheel 47, the arm 80 carried by said sleeve with which the rear end of the spring 78 is connected is moved backward, while at the same time the brake shoe 76 is moved forward by means of the rod 75. Consequently tension is applied to both ends of the spring, thereby giving quicker action in releasing the brake. Also by mounting the spring in this manner it does not work against the latch lever 63, since, when the plows are being lifted, the arm 59 of the lever 57, with which the spring 78 is connected through the sleeve 73 and connecting rod 71, is then moved away from the latch lever 63, permitting such latch lever to move into operative position under the influence of the spring 65.

By the construction described, we have provided a tractor plow in which the plow proper is hitched directly to the tractor frame, so that the parts are closely coupled and the advantages of a low-down hitch are realized. For plowing at different depths the point of hitch may readily be adjusted vertically, within the limits permitted by the range of movement of the lever 29, by means of the crank 41, and the depth limiting stop be at the same time correspondingly adjusted. The rocking movement of the lever 29 in either direction is limited by the transverse plate 11. When the plow is to be raised above the ground for transportation purposes, this is easily accomplished by the power of the tractor, aided by the manual effort of the operator, as above described, and it is then supported by the wheel 47 on which it rides while being transported from place to place.

It will be understood that in describing in detail the specific form in which we have embodied our invention as illustrated in the accompanying drawings, we have not intended by so doing to limit our invention to the specific construction shown and described, except in so far as such specific construction may be particularly claimed, as in various respects our invention is generic in character, and the claims hereinafter made are therefore to be construed accordingly.

What we claim as our invention and desire to secure by Letters Patent, is—

1. A plow comprising a plow beam, a ground wheel, a vertically swinging member connecting the beam with said wheel, whereby the beam may be swung about the axis of said wheel to raise or lower the plow, a brake movably mounted on said member and adapted to cooperate with said wheel to effect the swinging of said member to lift the plow by the draft power, and a manually-operable lever swinging substantially as a unit with said member for applying said brake.

2. A plow comprising a plow beam, a ground wheel, a vertically swinging member connecting the beam with said wheel, whereby the beam may be swung about the axis of said wheel to raise or lower the plow, a brake movably mounted on said vertically swinging member and adapted to cooperate with said wheel to effect the swinging of said member to lift the plow by the draft power, and a manually-operable lever movable with said member for applying said brake, and for transmitting manual plow lifting effort to said member.

3. A plow comprising a plow beam, a ground wheel, a vertically swinging member connecting the beam with said wheel, said member having pivotal mounting on said plow beam, a brake mounted on said member and adapted to cooperate with said wheel to effect the swinging of said member to lift the plow by the draft power, a manually-operable lever swinging substantially concentrically with the pivotal mounting of said member on said plow beam, and means actuated by said lever for applying said brake.

4. A plow comprising a plow beam, a ground wheel, a vertically swinging member connecting the beam with said wheel, whereby the beam may be swung about the axis of said wheel to raise or lower the plow, a brake adapted to cooperate with said wheel to effect the swinging of said member to lift the plow by the draft power, a manually-operable lever carried by said member and swinging substantially directly therewith, and means actuated by forward movement of said lever for applying said brake, said means comprising a motion transmitting member disposed substantially coaxially with the pivotal connection between said vertically swinging member and said beam.

5. A plow comprising a plow beam, a ground wheel, a vertically swinging axle connecting the beam with said wheel and pivoted to swing about the axis of said wheel, for supporting the plow when it is in its elevated position, a brake movably mounted directly on said axle and adapted to cooperate with said wheel to effect the swinging of said axle to lift the plow by the draft power, a manually operable lever connected to said swinging axle, and connections between said lever and said brake, whereby said lever is adapted for actuating said brake and for imparting manual force to said axle to aid in so swinging said axle.

6. A plow comprising a plow beam, a ground wheel, a vertically swinging axle connecting the beam with said wheel and pivoted to swing about the axis of said wheel, for supporting the plow when it is in its elevated position, a brake pivotally mounted directly on said axle and adapted to cooperate with said wheel to effect the swinging of said axle to lift the plow by the draft power, and a manually-operable lever for applying said brake, said lever being mounted on the axle and being movable in a forward direction to apply said brake and to apply manual effort to said axle to lift the plow.

7. A plow comprising a plow beam, a ground wheel, a vertically swinging axle connecting the beam with said wheel and pivoted to swing relative to a pivot bearing on the beam, for supporting the plow when it is in its elevated position, a lever swinging substantially concentrically with said axle, a brake adapted to be applied to said wheel, and means mounted on said axle and actuated by said lever for applying said brake.

8. A plow comprising a plow beam, a ground wheel, a vertically swinging axle connecting the beam with said wheel and pivoted to swing about the axis of said wheel, for supporting the plow when it is in its elevated position, a lever movable with said axle, a brake adapted to be applied to said wheel, a sleeve rotatable concentrically with respect to the axle and operatively connected with said brake, and means operatively connecting said lever with said sleeve whereby the brake may be appplied by operating said lever.

9. A plow comprising a plow beam, a ground wheel, a vertically swinging axle connecting the beam with said wheel and pivoted to swing about the axis of said wheel, for supporting the plow when it is in its elevated position, a brake adapted to be applied to said wheel, a sleeve loosely mounted on the axle, a rod connecting said sleeve with said brake for moving the brake into operative engagement with said wheel, a spring connected with said sleeve and with said brake for moving the same out of operative position, and a lever operatively connected with said sleeve for rocking the same to apply the brake.

10. A plow comprising a plow beam, a ground wheel, a vertically swinging axle connecting the beam with said wheel and pivoted to swing about the axis of said wheel, for supporting the plow when it is in its elevated position, a brake adapted to be applied to said wheel, a sleeve loosely mounted on the axle, an arm carried by said sleeve, a rod connecting said arm with the brake, an oppositely-disposed arm carried by said sleeve, a spring connected with the latter arm and with the brake, and a lever for rocking said sleeve.

11. A plow comprising a plow beam, a ground wheel, a vertically swinging axle connecting the beam with said wheel and pivoted to swing about the axis of said wheel, for supporting the plow when it is in its elevated position, a brake adapted to be applied to said wheel, a sleeve loosely mounted on the axle, an arm carried by said sleeve, a rod connecting said arm with the brake, an oppositely-disposed arm carried by said sleeve, a spring connected with the latter arm and with the brake, a third arm carried by said sleeve, and a lever carried by the axle and connected with said third arm for rocking said sleeve.

12. A plow comprising a plow beam, a ground wheel, a vertically swinging axle connecting the beam with said wheel and pivoted to swing about the axis of said wheel, for supporting the plow when it is in its elevated position, a brake mounted on said axle and movable into and out of engagement with said wheel, a lever mounted on said axle, and means mounted on the axle and actuated by said lever for applying said brake.

13. A plow comprising a plow beam, a ground wheel, a vertically swinging axle connecting the beam with said wheel and pivoted to swing about the axis of said wheel, for supporting the plow when it is in its elevated position, a brake mounted on said axle and movable into and out of engagement with said wheel, an upwardly projecting arm carried by said axle, a lever fulcrumed on said arm, and means moving with said axle and actuated by said lever for applying said brake.

14. A plow comprising a plow beam, a ground wheel, a vertically swinging axle connecting the beam with said wheel and pivoted to swing about the axis of said wheel, for supporting the plow when it is in its elevated position, a brake mounted on said axle and movable into and out of engagement with said wheel, an upwardly projecting arm carried by said axle, a lever fulcrumed on said arm, and means mounted on the axle and actuated by said lever for applying the brake.

15. A plow comprising a plow beam, a ground wheel, a vertically swinging axle connecting the beam with said wheel and pivoted to swing about the axis of said wheel, for supporting the plow when it is in its elevated position, a brake mounted on said axle and movable into and out of engagement with said wheel, an upwardly projecting arm carried by said axle, a lever fulcrumed on said arm, means actuated by said lever for applying said brake, and a latch carried by said arm for locking the plow in its elevated position, said latch being movable out of operative position by reverse movement of said lever.

16. A plow comprising a plow beam, a ground wheel, a vertically swinging axle connecting the beam with said wheel and pivoted to swing about the axis of said wheel, for supporting the plow when it is in its elevated position, a brake mounted on said axle and movable into and out of engagement with said wheel, an upwardly projecting arm carried by said axle, a lever fulcrumed on said arm, means actuated by said lever for applying said brake, a latch carried by said arm for locking the plow in its elevated position, said latch being movable out of operative position by reverse movement of said lever, and means whereby said lever may be locked against reverse movement.

17. A plow comprising a plow beam, a ground wheel, a vertically swinging member connecting the beam with said wheel, whereby the beam may be swung about the axis of said wheel to raise or lower the plow, a brake movably mounted on said vertically swinging member between said beam and said wheel and adapted to cooperate with said wheel to effect the swinging of said member to lift the plow by the draft power, means extending from said member forming a broken lever, and means actuated by relative movement between the two parts of said broken lever for applying said brake.

18. A plow comprising a plow beam, a ground wheel, a vertically swinging axle connecting the beam with said wheel and pivoted to swing about the axis of said wheel, for supporting the plow when it is in its elevated position, a brake movably mounted on said axle and adapted to cooperate with said wheel to effect the swinging of said axle to lift the plow by the draft power, means extending from said axle forming a broken lever, the two parts of which have limited relative movement, means actuated by such relative movement for applying said brake, the continued movement of said lever after the setting of said brake transmitting manual effort tending to swing said axle to plow lifting position, and spring means for releasing said brake.

19. A plow comprising a plow beam, a ground wheel, a vertically swinging axle connecting the beam with said wheel and pivoted to swing about the axis of said wheel and about a pivot bearing on said beam, for supporting the plow when it is in its elevated position, a brake mounted on said axle and movable into and out of engagement with said wheel, means extending from said axle forming a broken lever having pivotal movement about the axis of the pivot bearing on said beam, a latch carried by said lever for locking the plow in its elevated position, the two parts of said broken lever having relative movement in opposite directions, and means actuated by said relative movement in one direction for applying said brake, relative movement between the two lever parts in the opposite direction serving to release said latch.

20. A plow comprising a beam adapted to be connected with a draft element, a ground wheel, a swinging member on which said wheel is journaled, said member extending rearwardly therefrom to the beam and having pivotal connection therewith, whereby the beam may be raised or lowered by swinging said member in a vertical plane, a brake movably mounted on said swinging member and adapted to be moved into braking engagement with said wheel, a lifting lever adapted to swing said swinging member and movable relatively thereto, and brake-operating connections actuated by movement of said lever with respect to said swinging member and comprising a motion transmitting member rotatably mounted coaxially with the pivotal connection between said swinging member and the beam, said connections serving to limit the movement of said lever with respect to said swinging member when the brake is moved into engagement with the wheel, whereby further movement of the lever actuates the swinging member.

21. A plow comprising a beam adapted to be connected with a draft element, a ground wheel, a swinging member on which said wheel is journaled, said member extending rearwardly therefrom to the beam and having pivotal connection therewith, whereby the beam may be raised or lowered by swinging said member in a vertical plane, a brake supported for coaxial movement with said wheel and adapted to be moved into braking engagement therewith, a lifting lever adapted to swing said swinging member and movable relatively thereto, and brake-operating connections actuated by movement of said lever with respect to said swinging member to apply the brake to the wheel and restrict movement of the lever with respect to said swinging member, said brake operating connections comprising a motion transmitting member mounted coaxially with the pivotal connection between said swinging member and the beam.

22. In a plow adapted for connection to a tractor, the combination of two plow beams, plow bottoms mounted thereon, a single ground wheel disposed in a plane between the vertical longitudinal planes of said plow beams, a vertically swinging axle connecting the beams with said wheel and pivoted to swing about the axis of said wheel for supporting the plow when it is in its elevated position, draft means for connecting the plow to the tractor and adapted to hold the plow against tilting laterally when raised to elevated position on said single ground wheel, a brake adapted to cooperate with said wheel to effect the swinging of said axle to lift the plow by the draft power, a manually operable lever connected to said swinging axle, and connections between said lever and said brake, whereby said lever is adapted for actuating said brake and for imparting manual force to said axle to aid in so swinging said axle.

23. A plow comprising a plow beam, a ground wheel, a vertically swinging axle connecting the beam with the wheel and pivoted to swing about the axis of said wheel for supporting the plow when it is in its elevated position, a brake adapted for cooperation with said wheel for swinging said axle to lift the plow above the ground, means for mounting said brake on said axle, and an adjustable stop in the form of a screw-threaded shaft mounted on the beam and having its lower end adapted to engage the said mounting means, whereby the axle is held in depth-limited plowing position.

THEOPHILUS BROWN.
CARL G. STRANDLUND.